(12) United States Patent
Nagarajan et al.

(10) Patent No.: US 7,974,504 B2
(45) Date of Patent: Jul. 5, 2011

(54) REFLECTION SUPPRESSION IN A PHOTONIC INTEGRATED CIRCUIT

(75) Inventors: Radhakrishnan L. Nagarajan, Cupertino, CA (US); Masaki Kato, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 42 days.

(21) Appl. No.: 12/058,652

(22) Filed: Mar. 28, 2008

(65) Prior Publication Data

US 2009/0245719 A1    Oct. 1, 2009

(51) Int. Cl.
  *G02B 6/12* (2006.01)
  *G02B 6/28* (2006.01)
  *G02B 6/34* (2006.01)

(52) U.S. Cl. .............. 385/14; 385/24; 385/37; 385/43

(58) Field of Classification Search .......... 385/14, 385/24, 37, 43, 129–132
See application file for complete search history.

(56) References Cited

U.S. PATENT DOCUMENTS

| | | | | |
|---|---|---|---|---|
| 5,206,920 A | * | 4/1993 | Cremer et al. | 385/37 |
| 5,982,960 A | * | 11/1999 | Akiba et al. | 385/24 |
| 6,055,349 A | * | 4/2000 | Seino et al. | 385/50 |
| 6,084,992 A | * | 7/2000 | Weber et al. | 385/24 |
| 6,240,118 B1 | * | 5/2001 | Doerr et al. | 372/64 |
| 6,389,201 B1 | * | 5/2002 | Urino | 385/43 |
| 6,493,487 B1 | * | 12/2002 | Temkin et al. | 385/37 |
| 6,526,203 B1 | * | 2/2003 | Gonzalez et al. | 385/37 |
| 6,973,236 B2 | * | 12/2005 | So et al. | 385/37 |
| 7,006,719 B2 | * | 2/2006 | Joyner et al. | 385/14 |
| 7,151,873 B2 | * | 12/2006 | Yamazaki et al. | 385/39 |
| 7,492,991 B2 | * | 2/2009 | Beelen et al. | 385/37 |
| 2002/0057875 A1 | * | 5/2002 | Kaneko | 385/37 |

* cited by examiner

*Primary Examiner* — Daniel Petkovsek
(74) *Attorney, Agent, or Firm* — Ross M. Carothers; David L. Soltz

(57) ABSTRACT

Embodiments of the present invention provide systems, devices and methods in which optical reflections are reduced in a photonic integrated circuit. These embodiments include reflection suppression elements which operate to dissipate optical energy that would otherwise provide a source for optical reflections which may impact the operation of one or more devices within the photonic integrated circuit. In particular, within photonic integrated circuits incorporating semiconductor optical amplifiers, embodiments of the present invention include reflection suppression elements which operate to dissipate optical energy preventing the semiconductor optical amplifiers from operating in a gain-clamped mode.

16 Claims, 7 Drawing Sheets

REFLECTION SUPPRESSION IN A PHOTONIC INTEGRATED CIRCUIT

BACKGROUND OF THE INVENTION

1. Field of the Invention

The present invention relates generally to transmission of optical signals in a communication network and, more particularly, to reflection suppression structures in semiconductor circuits, such as photonic integrated circuits, as part of such communication networks.

2. Description of the Related Art

Optical telecommunication networks have become increasingly more advanced as the need for high speed optical traffic increases. Some of the primary functions carried out in an optical telecommunication network include the amplification of a wavelength division multiplexed (WDM) signal comprising a plurality of individual optical channel signals, providing the optical channels signals for further processing. One way this need for higher speed throughput has been addressed is through the use of semiconductor integrated circuits, more specifically, photonic integrated circuits (PICs). These devices provide the integration of both active and passive optical components on a single substrate and are integrated with other optical components to form a multifunctional optical device. Compared to the deployment of discrete optical components, such monolithic PIC chips can significantly reduce the size of optical components necessary in the optical system, as well as significantly reducing the overall costs of such systems. Such PIC chips can be fabricated to perform as a receiver photonic integrated circuit (RxPIC), a transmitter photonic integrated circuit (TxPIC), or both.

Generally, RxPIC systems, among other things, comprise an optical amplifier, such as a semiconductor optical amplifier (SOA), an arrayed waveguide grating (AWG) and a plurality of light detectors, such as photodiodes (PD). The SOA has an input which accepts a multiplexed optical signal, from an optical link for example, and amplifies the signal prior to passing it on to an input of the AWG. The AWG then demultiplexes the incoming multiplexed optical signal into a plurality of channel signals, each of the plurality of channel signals are provided as an output from the AWG and coupled to a respective photodiode for additional processing of the signal channel.

The semiconductor optical amplifier is advantageous in such PIC structures since it has the ability to directly amplify the incoming optical signal without the need to first convert the incoming optical signal into the electrical domain. The SOA is essentially a laser diode, having an optical gain region formed between two end facets. The end facets of the SOA typically are provided with an anti-reflective material to prevent light from being reflected back into the gain medium of the SOA, ultimately preventing the amplifier from lasing. Aside from anti-reflective coatings, other measures can be performed to reduce reflections which may cause the SOA to operate as a laser. For example, the input and output facets of the gain medium may be angled with respect to a longitudinal axis of the gain medium reducing further the amount of amplified light reflected back into the gain medium. However, this leads to alignment problems when coupling the amplified signal to other optical components.

When an SOA is integrated into a monolithic semiconductor device, such as a PIC device, however, other optical components and the interfaces or transitions between the optical components, as well as the input and output facets of such a monolithic device, may provide a source of undesirable reflections. For example, the various interface points or transition points between the free space regions and adjacent waveguide structures of the AWG may undesirably reflect light back into the device and toward the SOA, where the reflected signal is amplified once again. Where multiple reflective surfaces exist, optical energy is repeatably passed through the SOA, the optical energy subsequently amplified during each pass through the SOA, eventually, reaching a lasing threshold resulting in the SOA lasing at the frequency corresponding to the optical noise being reflected. While not necessarily detrimental to the signal output from the PIC device, as will be better understood with reference to the further discussion below, when lasing the SOA transforms into a gain-clamped amplifier, greatly reducing the gain achievable in the device.

What is needed is a semiconductor photonic integrated circuit which includes a plurality of optical components, at least one of the optical components including structures which greatly reduce reflections to provide a monolithic structure including integrated amplification.

SUMMARY OF THE INVENTION

According to this disclosure, embodiments of the present invention include a plurality of processing optical elements incorporating anti-reflective or reflection suppression structures, preferably integrated on the same substrate in a photonic integrated circuit.

In certain embodiments of the present invention, at least one component integrated within the photonic integrated circuit is coupled to a waveguide terminating in a reflection suppression structure to reduce undesirable reflections propagating back into the various components of the photonic integrated circuit. In some embodiments, the reflection suppression structure can include a passive structure such as a waveguide having a tapered portion which dissipates the undesirable light into the surrounding substrate. In other embodiments of the invention, the reflection suppression structure can include light absorption materials which act to absorb the light and prevent its reflection back into the optical components along the signal path of the photonic integrated circuit. In certain other embodiments of the invention, the reflection structures may include, or additionally include, active components in the optical path which act to absorb light, preventing the light from reflecting back into the optical components of the photonic integrated circuit.

In still other embodiments of the invention, a combination of passive structures and active devices are employed to further reduce the internal reflections within the photonic integrated circuit while also providing information regarding the light energy, or the data which it represents, traveling through the photonic integrated circuit. This information can then be utilized to provide feedback on the operation of the photonic integrated circuit.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein any like reference symbols refer to like parts.

DETAILED DESCRIPTION OF THE INVENTION

Figure 1:
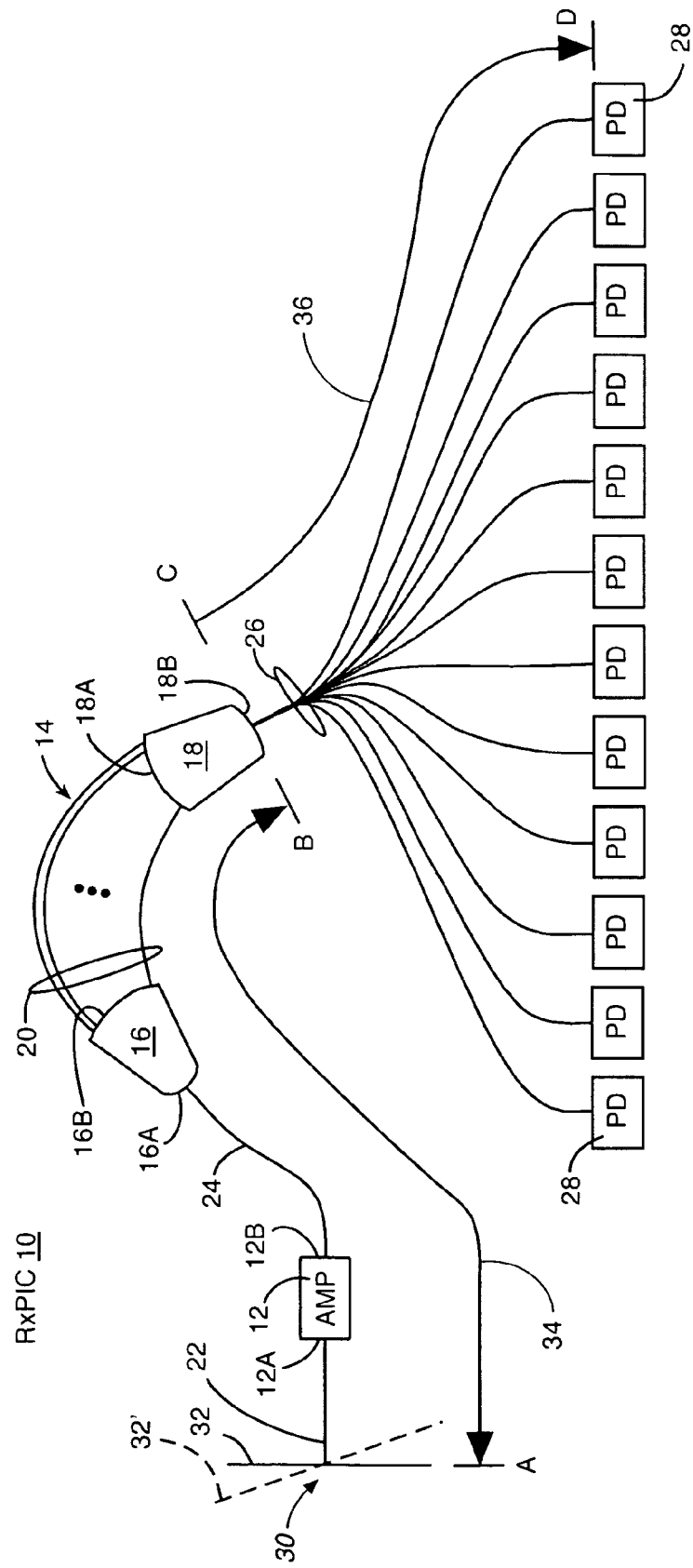
FIG. 1 is a schematic optical circuit diagram of an exemplary photonic integrated circuit.

Reference is now made to FIG. 1 which illustrates a photonic integrated circuit 10 designed to receive an incoming wavelength division multiplexed (WDM) signal. More specifically, FIG. 1 illustrates a ten-channel photonic integrated circuit comprising an amplifier 12, a multiplexer/demultiplexer in the form of an arrayed waveguide grating 14 and a plurality of detectors 28, such as photodetectors 28. The AWG 14 comprises an input slab or free space region 16 and an output slab or free space region 18. Each free space region 16, 18 includes an input interface 16A, 18A and an output interface 16B, 18B where the free space region interfaces to surrounding structures. As shown, the amplifier 12 is coupled via a waveguide 22 to an input 30 of photonic integrated circuit 10 at an input facet 32. The amplifier 12 is further coupled via waveguide 24 to the input free space region 16 of the AWG 14 where the amplified incoming WDM signal is received by the AWG 14 and demultiplexed into the various signal wavelength output channel signals, $\lambda_1$-$\lambda_{10}$, and output at the output free space region 18 of AWG 14.

As is well known in the art, the input multiplexed signal received at the input free space region 16 of AWG 14 is directed to a plurality of waveguides 20, each of the plurality of waveguides having a differing length equal to a multiple of the center frequency. Thus, at the output free space region 18, the optical signals interfere resulting in signals of particular wavelengths being focused upon particular focal points along or adjacent the output interface 18B of the output free space region 18, as is discussed in greater detail below. A plurality of output waveguides 26 are coupled to the output free space region 18 at the output interface 18B and direct one of the plurality of output signals, $\lambda_1$-$\lambda_{10}$, to a respective one of the plurality of photodetectors 28. The photodetectors, in turn, transform the optical signal into the electrical domain for further processing.

As depicted in FIG. 1, the integrated optical components include structures which may undesirably reflect light back into such structures and, ultimately, back into the SOA where it is amplified once again. For example, a portion of light received at input 30, amplified by the SOA 12 and processed by AWG 14 may reflect off the output interface 18B of the output free space region 18. This reflected light would then travel back through AWG 14, be amplified by SOA 12 and provided to input facet 32, which may then reflect a portion of the light back into the photonic integrated circuit 10. This reflected light is repeatedly amplified and reflected along an optical path, generally depicted as path 34, between the input facet 32 and the output interface 18B of the output free space region 18, denoted as points A and B along optical path 34, respectively. Repeated application of the amplification/reflection cycle, between points A and B along optical path 34 for example, will eventually result in the SOA 12 reaching a threshold corresponding to the particular frequency or frequencies of the reflected signals and lasing at these frequencies. While the reflected optical energy does not directly impede the ability of the photonic integrated circuit to receive and process the incoming WDM signal, the lasing clamps the gain of the SOA, greatly reducing the gain available for application to the incoming WDM signal.

This is but one example of an optical path confined by two interface structures of the photonic integrated circuit, effectively creating a laser cavity within which lasing of SOA 12 can occur. Other structures which can lead to undesirable reflections include, but are not limited to, input interface 16A and output interface 16B of input free space region 16 and input interface 18A of output free space region 18, as well as an input interface 12A and an output interface 12B of the SOA 12, or any other interface or transition between the various optical components of the photonic integrate circuit. It is important to note that the designations of input and output to interfaces 16A/18A and 16B/18B, respectively, are relative to the direction the light propagates through the AWG. Therefore, for receiver photonic integrated circuit structures which receive a WDM signal, such as the photonic integrated circuit 10 of FIG. 1, free space region 16 will serve as an input free space region, however, for transmitter photonic integrated circuit structures which transmit a WDM signal, free space region 16 would serve as an output free space region. For more information regarding receiver photonic integrated circuits and transmitter photonic integrated circuits see U.S. Pat. No. 7,116,851, entitled "Optical Signal Receiver, An Associated Photonic Integrated Circuit (RxPIC), and Method Improving Performance," and U.S. Pat. No. 7,283,694, entitled "Transmitter Photonic Integrated Circuits (TxPICs) and Optical Transport Network system Employing TxPICs," both of which are incorporated by reference in their entirety.

While the input facet 32 can be angled, as depicted as dashed line 32', with respect to the longitudinal axis of waveguide 22 in an attempt to reduce undesirable reflections, such structure modifications do not guarantee that these undesirable reflections will be suppressed sufficiently to prevent the SOA 12 from lasing.

Figure 2:
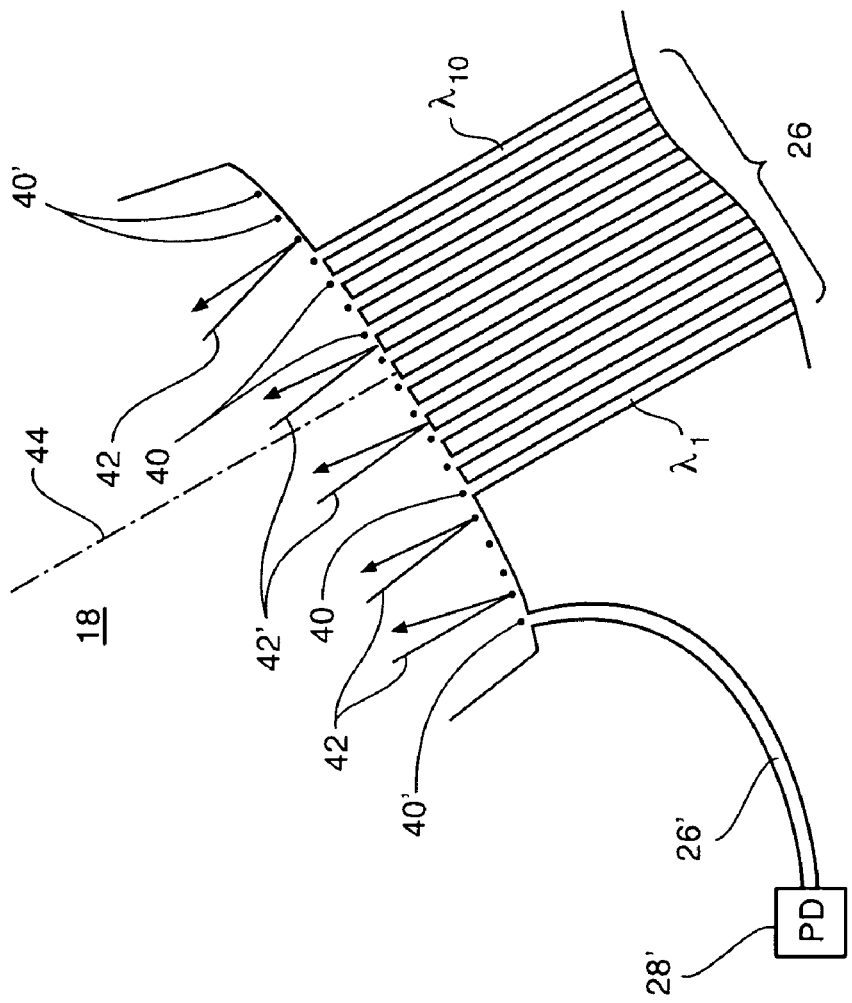
FIG. 2 is a enlarged view of a portion of the exemplary photonic integrated circuit of FIG. 1.

Now turning to FIG. 2, a more detailed depiction of one embodiment of output free space region 18 will be discussed in greater detail. As shown, the output of output free space region 18 interfaces with output waveguides 26 representing the individual signal channels of the multiplexed input signal, in this case $\lambda_1$-$\lambda_{10}$. It is important to note, such an exemplary ten-channel photonic integrated circuit is only one such example. With a properly designed AWG, many additional channels may be added to, and processed by, the photonic integrated circuit. Furthermore, the various reflection suppression structures described or contemplated herein can apply to any optical component impacted by feedback of reflected optical energy. For example, while the discussion is focused on AWG devices, the present invention applies to Mach Zehnder multiplexers or filters or DFB lasers in a TxPIC device where the optical reflections can destabilize the laser.

As previously mentioned, the waveguides 20 of AWG 14 are of differing lengths resulting in the signals traveling thereon to reach an input of output free space region 18 at slightly different phases, respectively. Due to this phase shift, the optical energy from each waveguide 20 interferes with the optical energy from the remaining waveguides 20, resulting in the definition of a plurality of focal points 40 near the output interface 18B of the output free space region 18, each focal point 40 corresponding to a particular frequency of optical energy. The focal points 40 depicted in FIG. 2, as well as other figures as part of this application, are depicted for simplicity of discussion only. There is no attempt at limiting the present invention to AWG structures having more or less focal points than what are depicted. As should be readily understood by one of ordinary skill in the art, depending upon the specific design of the AWG, more focal points or less focal points may be defined. Furthermore, while waveguides 26 are shown symmetrically positioned about a geometric longitudinal axis of the output free space region 18, depicted as centerline 44, waveguides 26 may be positioned on one side or distributed on both sides with respect to the geometric longitudinal axis of the output free space region 18, arranged either symmetrically or non-symmetrically with respect to the geometric longitudinal axis of the output free space region 18. Additionally, the waveguides 26 may be positioned on one side or distributed on both sides with respect to the optical longitudinal axis of the output free space region 18 (not shown), arranged either symmetrically or non-symmetrically with respect to the optical longitudinal axis of the output free space region 18. Furthermore, regardless of their specific depicted location, each of the focal points 40 along with the corresponding waveguide 26 may be positioned either within the $1^{st}$ order Brillouin zone, or a higher order Brillouin zone. Theses waveguide 26 characteristics apply to the embodiments of FIGS. 3-5 as well.

As shown, waveguides 26 are fabricated as extensions of the output free space region 18 allowing for the transmission of light from the output free space region 18, through the waveguides 26, eventually to the photodetectors 28 for further processing of the signal channel data. Since the waveguides 26 are fabricated upon the same substrate as the AWG 14, the optical path, as generally depicted as optical path 36 between points C and D in FIG. 1, is continuous from the AWG 14, through the waveguides 26 and to the photodetectors 28. The photodetectors 28 act to absorb the light energy, thus, very little light is reflected from the output interface 18B of the output free space region 18, at the point where the corresponding waveguide 26 transitions or interfaces to the output interface 18B of the output free space region 18. Similarly, as depicted, a waveguide 26' may be coupled to the output free space region 18 of AWG 14 at the location of one of the focal points 40, coupling the corresponding signal channel to an active device, such as photodetector 28', similar to photodetector 28 for example. In this case, no reflected optical energy from the photodiode 28' or waveguide 26' back toward the output free space region 18 is perceived, the light energy optically transmitted from the output free space region 18 through the waveguide 16' and to the photodetector 28' where the light energy is absorbed. In should be noted that a photodetector, such as photodetector 28', can be positioned on the input interface 16A of input free space region 16 to measure optical energy which is representative of the amount of light which is reflected off the various interfaces 16B, 18A, and 18B, back into AWG 14.

The various components of the photonic integrated circuit 10, including the AWG, SOA and interconnecting waveguides, described herein may be fabricated in any suitable manner, such as described in U.S. Pat. No. 7,283,694 entitled "Transmitter Photonic Integrated Circuits (TxPICs) and Optical Transport Network System Employing TxPICs," already incorporated herein by reference in its entirety.

In contrast to focal points 40 which correspond to focal points of desired signal channel outputs coupled to waveguides 26, there are focal points 40' which are not of interest, and may be a source of undesirable reflected light, the light energy reflecting off the output interface 18B of the output free space region 18 at the focal point 40', back through the AWG 14, and eventually back to SOA 12, as generally depicted by arrows 42. It should be readily understood that arrows 42 are not specifically depicting the path of the reflected optical energy, but merely represent the fact that the optical energy is reflected off the output interface 18B of the output free space region 18 and back toward the SOA 12.

The SOA itself may be another source of unwanted signal noise. More specifically, the SOA 12, during operation, produces amplified spontaneous emission. Because of the broadband nature of these spontaneous emissions, many additional focal points along the output interface 18B of the output free space region 18 are defined with respect to the frequency components of the ASE. While the optical energy of the ASE may be quite small relative to the optical energy of the signal channels themselves, if the ASE noise is reflected back through the AWG 14 and the SOA 12, as discussed above relative other sources of noise, the ASE may be amplified to a point greater than what is needed to initiate laser of SOA 12. This is especially true for systems where a high amplification of the multiplexed input signal is desired.

It is these reflections 42, 42', resulting from optical energy reflecting off the output interface 18B of the output free space region 18, whether the source is from ASE, crosstalk or other sources of noise, which may lead to the lasing of SOA 12. The reflections 42 are optically coupled back through the AWG 14 to the SOA 12 where the signal is amplified once again before being reflected off the input facet 32 back into the SOA 12 where the signal is amplified once more. This amplification/reflection cycle is repeated until the SOA 12 reaches a threshold, resulting in SOA 12 lasing and functionally becoming a gain-clamped SOA.

One of ordinary skill in the art may note that often there are a plurality of waveguides fabricated at the output free space region of the AWG to ensure that the propagation of the optical wave front is not abruptly interrupted at the output interface of the output free space region. However, such waveguides are not sufficient to suppress reflections which originate on the output interface of the output free space region of the AWG.

Figure 3:
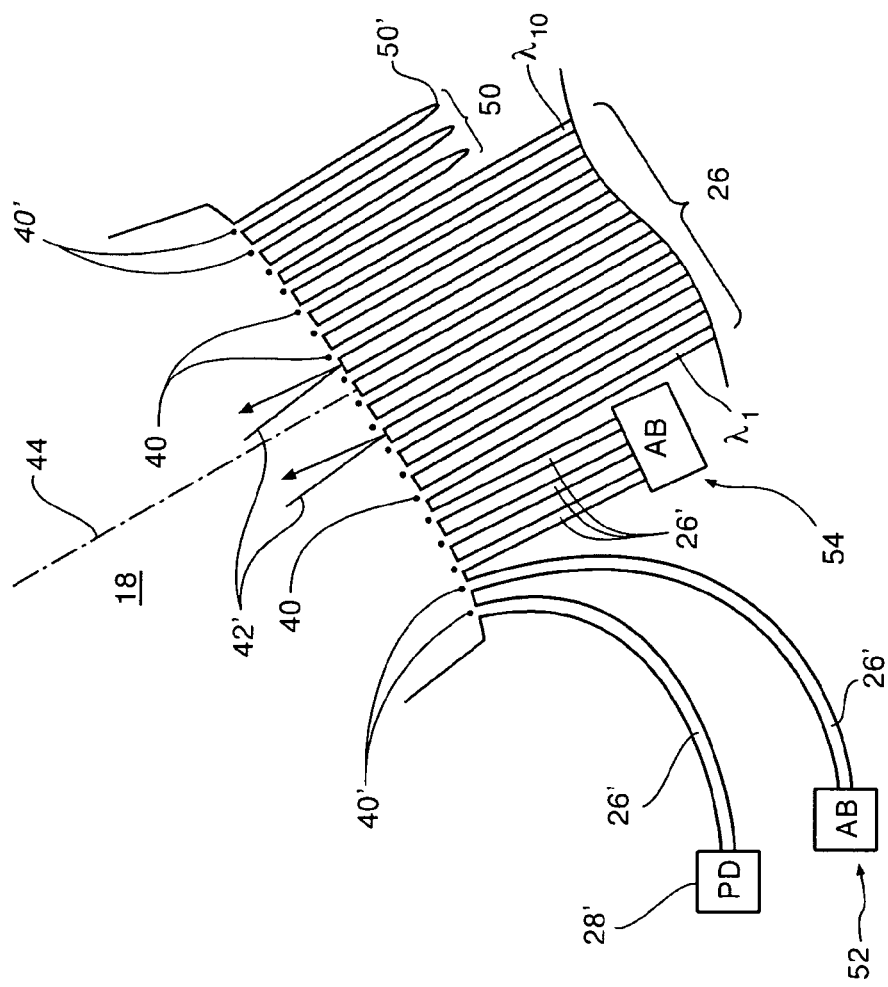
FIG. 3 is an enlarged view of a portion of the exemplary photonic integrated circuit of FIG. 1 incorporating exemplary embodiments of the present invention.

Now turning to FIG. 3, an enlarged view of the AWG 14 incorporating embodiments of the present invention will be discussed in greater detail. As shown, the AWG 14 of FIG. 3 further comprises additional reflection suppression structures in the form of waveguide structures 50, 52 and 54 adjacent a substantial number of focal points 40' such that very little light energy remains to reflect off the output interface 18B of the output free space region 18. It is important to note that since there are losses associated with the reflected light energy passing through the AWG, waveguides 50, 52 do not need to be placed adjacent each and every focal point as the reflected light from some focal points will lack sufficient energy to pass back through the AWG and reach the SOA 12. Moreover, some of these focal points 40 may be within a higher order Brillouin zone, and therefore be of lower power. Waveguides 50 are fabricated such that a first end portion of the waveguide 50 is coupled to the output interface 18B at a point adjacent to a focal point 40, guiding the light energy from the output free space region 18 of AWG 14 to the respective waveguide 50. As depicted, a second end portion or distal end of each waveguide 50 includes a tapered portion 50' which encourages the dissipation of the optical energy within the surrounding substrate. More specifically, as the light enters the tapered portion 50' of the distal end of waveguide 50 the mode expands, the light being absorbed in the surrounding substrate.

Alternatively, waveguides can be constructed to couple the light energy associated with any one focal point to a light absorbing material. For example, as depicted, a waveguide 52 can couple the light energy of the associated focal point 40 to a light absorbing material AB. Waveguide 52 can be curved away from the main signal channel grouping, as shown, to further move the light energy away from the signal channel waveguides 26 to minimize contamination of the signal channels. Additionally, multiple waveguides may be directed to a well of light absorption material. For example, as depicted, waveguides 54 may each couple the light energy of an associated focal point 40 to the light absorbing material AB. Absorbing material AB may be any suitable material which will absorb light energy to reduce, or otherwise suppress, reflection of the associated light. Such optical energy absorbing materials include any semiconductor material, or other material, with a band gap smaller than the propagating light, such a InGaAs or InGaAsP. While it is preferably to couple the light absorbing material AB to the output free space region 18 through the use of one or more waveguides 26' due to space constraints, light absorbing material AB can be positioned adjacent to the output interface 18B without the need for waveguides 26'.

While not necessary, the waveguides 26' may include curved portions to move the light energy away from the waveguide 26 and the signal channels traveling along the waveguides 26, isolating the light energy from the signals channels and minimizing any optical interference with the light energy of waveguides 26. Additionally, the curved waveguide portions depicted herein for illustrative purposes and are not drawn to scale. As one of ordinary skill would appreciate, such curved waveguide portions can impact the light energy due to their corresponding radius of curvature, therefore great care must be taken to design the waveguides 26' to include curved portions to provide better optical isolation while maintaining the integrity of the optical output signal channels transmitted by waveguides 26.

With the majority of light energy guided away from the output free space region 18 of AWG 12, little optical energy is left to reflect back toward the SOA 12. As mentioned above, since amplified spontaneous emission is broadband in nature, some light energy will be reflected between waveguides, reflected energy 42' located at a trough between two waveguides 26 for example. This light energy can be further reduced through design of the waveguides 26.

Figure 4:
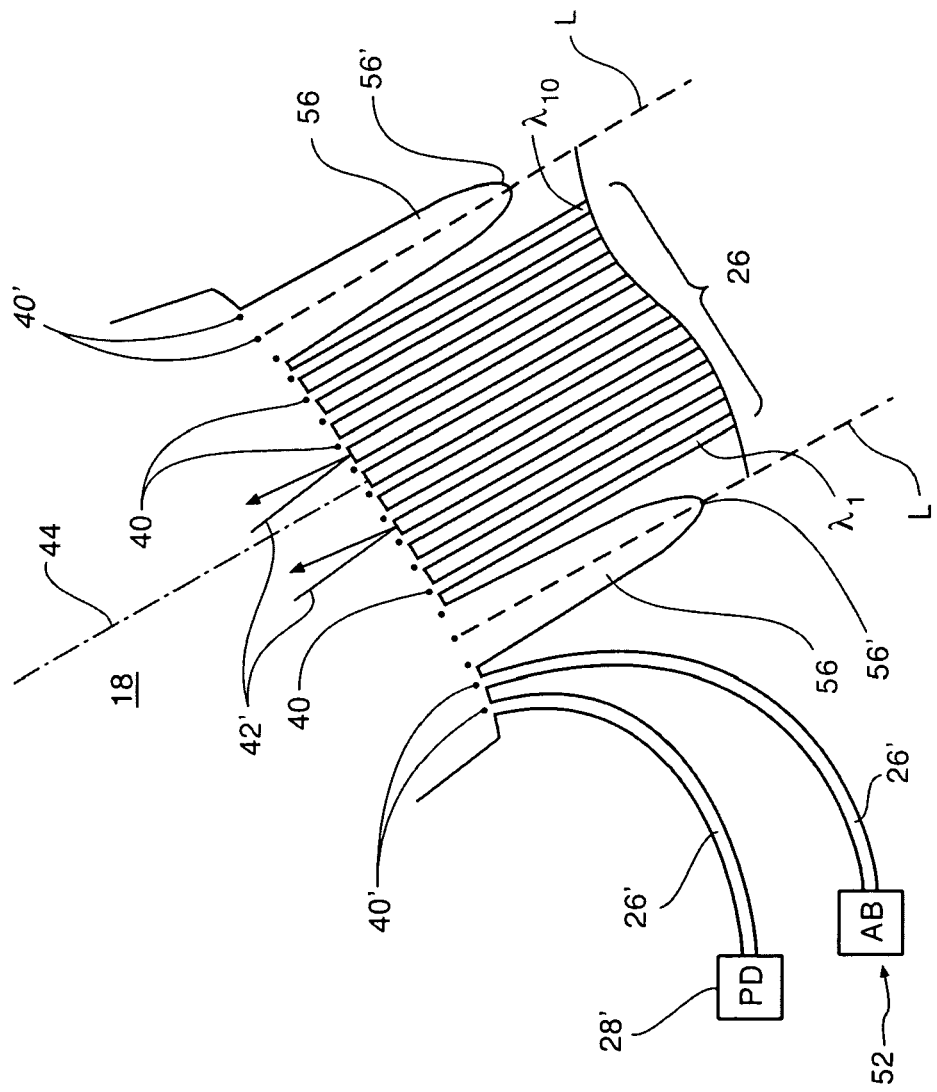
FIG. 4 is an enlarged view of a portion of the exemplary photonic integrated circuit of FIG. 1 incorporating another embodiment of the present invention.

Now turning to FIG. 4, another embodiment of the present invention is depicted. As shown, rather than individual reflection suppression waveguide structures fabricated adjacent individual focal points along the far end of the output free space region, larger structures are used to guide light energy away from the output free space region and eventually into the surrounding substrate. More specifically, as shown, reflection suppression waveguide structures 56 are formed adjacent a plurality of individual focal points 40 along the output interface 18B of output free space region 18 of AWG 14. As with other reflection suppression waveguide structures 50, 52 and 54, waveguide structures 56 direct light energy away from the output free space region 18 and into the surrounding substrate. As with waveguides 50, waveguides 56 include a tapered distal end 56' which expands the mode of the light as the light travels from the free space region 18 toward the output end of the tapered end 56', the light being absorbed within the surrounding substrate.

Such reflection suppression waveguide structures 56 are advantageous since, not only do they guide light energy associated with the adjacent focal points 40', they also act to guide light energy which is focused on the output interface 18B of the free space region 18 between two adjacent focal points 40' associated with waveguides 56, light energy provide through ASE for example. While the waveguide 56 is shown to be a generally symmetrical structure with respect to a longitudinal axis line L which runs substantially perpendicular to the output interface 18B of the free space region 18, shown in dashed line in FIG. 4, such a waveguide 56 can have a curved form, such as waveguide 26', in order to move the light energy guided by waveguide 56 away from waveguides 26 and further isolate the guided light energy from, the signal output channels. Such curved waveguide structures are non-symmetrical with line L, as depicted and discussed further with respect to FIG. 5 below.

While the waveguide structures 56 are depicted as having a tapered distal end 56', the distal end of waveguide 56 can optionally include a light absorbing material or an active device such as a photodiode, as with waveguide 52 and 26', respectively. The wider waveguide structure of waveguide 56, as noted above, advantageously collects and dissipates light which is focused adjacent the output interface 18B of the output free space region 18, at the location where waveguide 56 interfaces with free space region 18. This undesirable light includes not only the light which is focused at locations along the waveguide 56 and the output free space region 18, but also the light which is focused upon the output free space region 18 due to ASE present in the system. Incorporating an active component, such as photodiode 28', at the distal end 56' of waveguide 56 would provide for monitoring of the light received at the corresponding interface between the output free space region 18 and waveguide 56, as well as dissipation of the light energy. While providing for a more complicated fabrication, such a design would provide for data acquisition related to the light received, for power monitoring or signal integrity for example.

Figure 5:
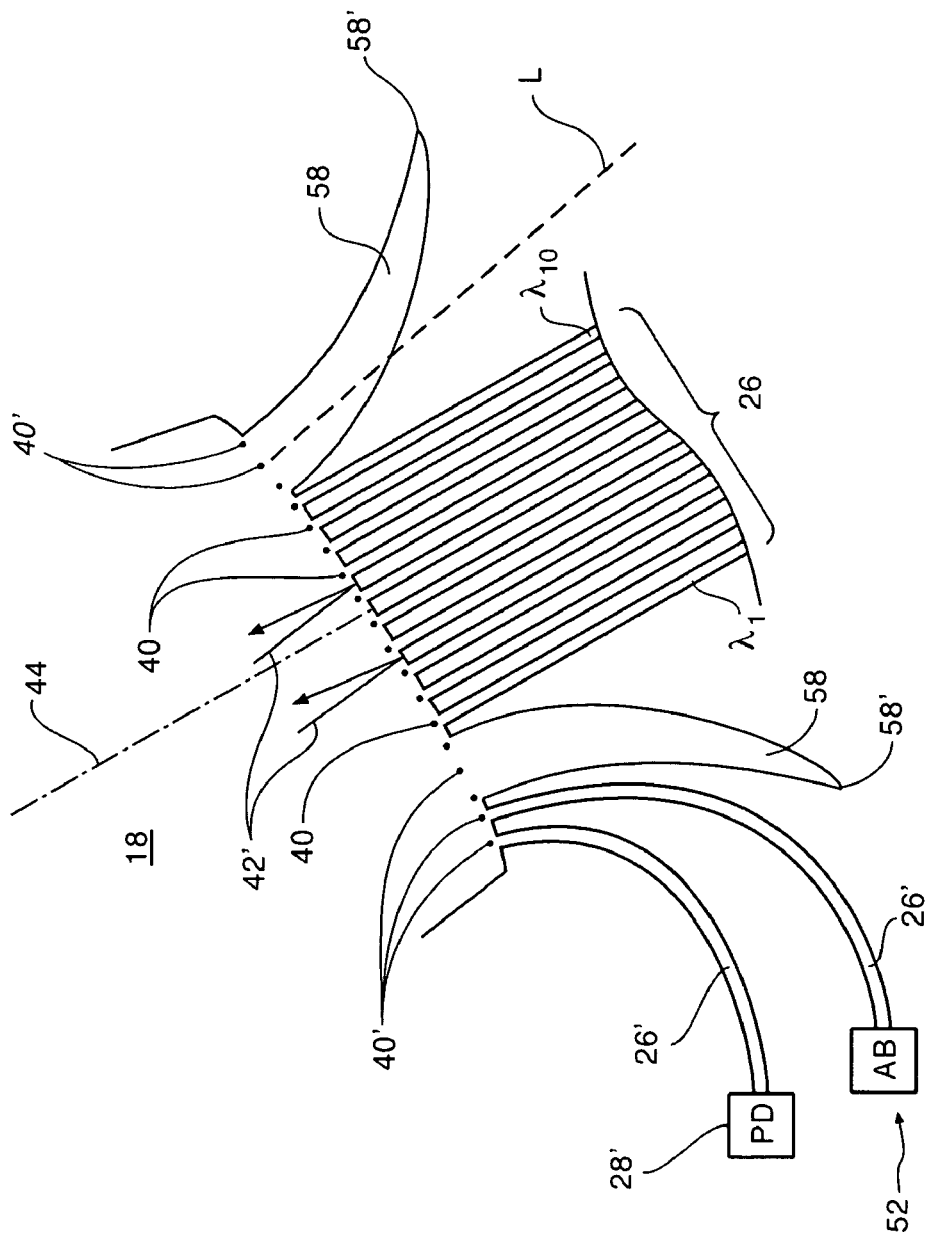
FIG. 5 is an enlarged view of a portion of the exemplary photonic integrated circuit of FIG. 1 incorporating yet another embodiment of the present invention.

With reference now to FIG. 5, another embodiment of the present invention will be discussed in greater detail. As with FIG. 4, rather than utilizing a plurality of single waveguides, a reflection suppression waveguide structure 58 is shown having a width at the interface point between the waveguide structure 58 and the free space region 18 greater than the distance between adjacent focal points 40'. In addition to having the advantages of waveguide 56, as discussed above, waveguides 58 is curved to provide additional isolation with respect to the waveguides 26, further minimizing optical noise on waveguides 26 due to the light traveling through waveguides 58. Thus, the longitudinal axis of waveguide 58 structures are nonsymmetrical about a line L perpendicular to the output interface 18B of the output free space region 18, shown in dashed line in FIG. 5.

As with other embodiments depicted and described herein, while only two waveguide 58 structures are depicted in the FIG. 5 embodiment, more or less such structures may be utilized. Moreover, a combination of such reflection suppression waveguide structures 58, and additional waveguides of dissimilar widths may be used in combination to reduce undesirable reflections. Additionally, as with other embodiments herein, waveguide 58 structures can include distal portions having light absorbing materials or active devices, such as photodiodes, which act to absorb the light which travels from the output free space region 18 and into the device via waveguide 58.

Figure 6:
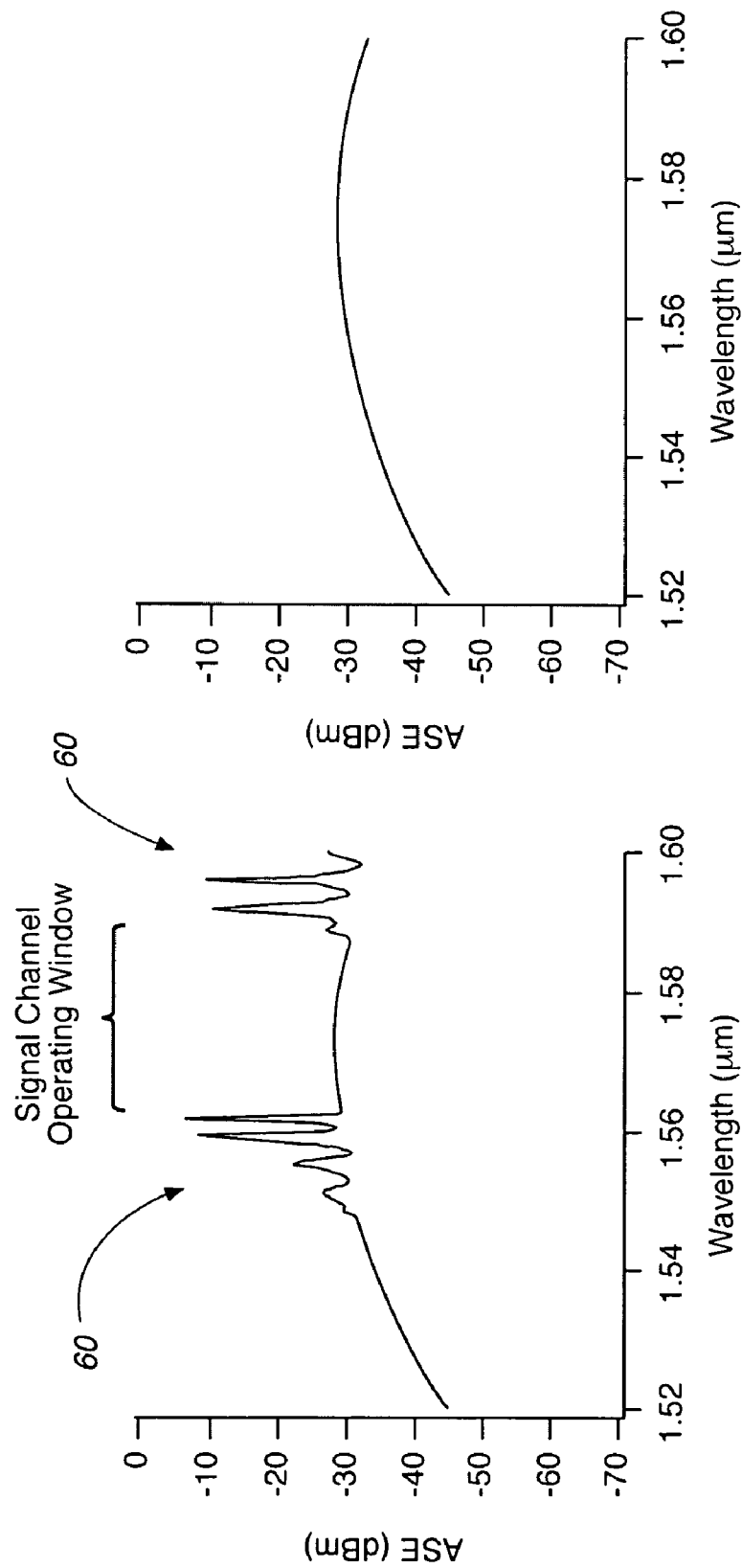
FIG. 6A depicts the output of a photonic integrated circuit.
FIG. 6B depicts the output of a photonic integrated circuit according to an embodiment of the present invention.

Referring now to FIGS. 6A and 6B, the output of a conventional system and a system employing the present invention are compared. More specifically, FIG. 6A depicts the amount of energy reflected from the output interface 18B of the output free space region 18 back through the AWG 14, re-amplified by SOA 12 and then passing out the input facet 32, where the reflected light energy is measured, with the use of a photodiode for example. In this example, the desired optical channels of interest correspond to optical wavelengths from about 1.56 μm to about 1.59 μm defining a signal channel operating window as depicted in FIG. 6A. For example, the desired data received by an exemplary photonic integrated circuit receiver is expected to be in this range. Therefore, through design, signal channel waveguides generally corresponding to the desired signal channel optical wavelengths are fabricated adjacent the output free space region 18 at the corresponding focal points. While preferably these signal channel waveguides are fabricated concurrently with the output free space region 18 of the AWG 14 using similar materials and processes to fabricate the optical paths, the signal channel waveguides can be fabricated in a separate process. Since the waveguides and corresponding active devices, such as photodiodes 28 used to optically receive the optical information, cooperate to absorb the optical energy at those wavelengths corresponding to the signal channel operating window, e.g. 1.56 to 1.59 μm, the reflected optical energy, e.g. those optical signals which are of little to no interest such as those produced through ASE, measured at these wavelengths is relatively small and defining a signal channel operating window as depicted in FIG. 6A, −30 dBm in this example.

Since the conventional system output of FIG. 6A assumes that only those optical wavelengths of interest have corresponding waveguides, a portion of the remainder of the optical energy received at the output interface 18B of the output free space region 18 is reflected by the output interface 18B back through the AWG 14, amplified by the SOA 12 and out the input facet 32. This reflected optical energy, for example ASE or those optical channels of little interest, resonate at various wavelengths as depicted as peaks 60 of FIG. 6A. Employing the reflection suppression techniques of the present invention, waveguides according to various embodiments of the present invention discussed or contemplated herein are fabricated along the output interface 18B of the output free space region 18 minimizing the reflected optical energy, as compared to the conventional system, as depicted in FIG. 6B. More specifically, with reference to FIG. 6B, undesirable reflections originating from optical energy reflected off the output interface 18B of the output free space region 18 are absorbed and prevented from reflecting back through the AWG 14 and SOA 12, and thus no energy peaks, such as peaks 60 in FIG. 6A, are perceived in FIG. 6B.

It is important to note that while the present invention has been described in terms of reflection suppression with respect to those optical signals reflected from the output interface 18B of the output free space region 18 of the AWG 14, there are other surfaces which promote undesirable optical reflections within the system 10. For example, undesirable reflection of an optical signal can occur at the output interface 16B of input free space region 16 of AWG 14. The optical signal, part of the ASE for example, can enter the input free space region 16 and reflect off the output interface 16B of free space region 16, back along waveguide 24 to SOA 12 and out the input facet 32 of RxPIC 10. As discussed previously above, all or a portion of the reflected signal can be reflected once more off the surface of the input facet 32 back into the RxPIC 10, amplified once more by SOA 12. As with output free space region 18, input free space region 16 of AWG 14 can include additional waveguide structures discussed or contemplated herein coupled to the distal end of the input free space region 16 to absorb additional unwanted optical energy and minimize or eliminate undesirable reflections caused by such energy.

Additionally, while discussed in terms of a receiving system, that is a photonic integrated circuit for receiving a WDM signal for processing, the present invention can also be used in systems designed for transmitting WDM signals. For example, a transmitter photonic integrated circuit (TxPIC) can include active devices which establish individual signal channels. These active devices, for example, can include a laser source, a modulator and an SOA, the laser source provides the source of optical energy which is modulated by the modulator and provided to the SOA for further amplification, to equalize the optical output energy across a plurality of multiple signal channels for example. Such a TxPIC can further include an AWG similar in construction to AWG 14, which accepts multiple optical signal channels and combines them into a single WDM signal for output from the TxPIC. As with the RxPIC system described above, the SOA output of the TxPIC may be positioned to provide an amplified output to the AWG of the TxPIC system, the various surfaces of the AWG reflecting undesirable optical energy back toward the SOA and the laser source itself.

Figure 7:
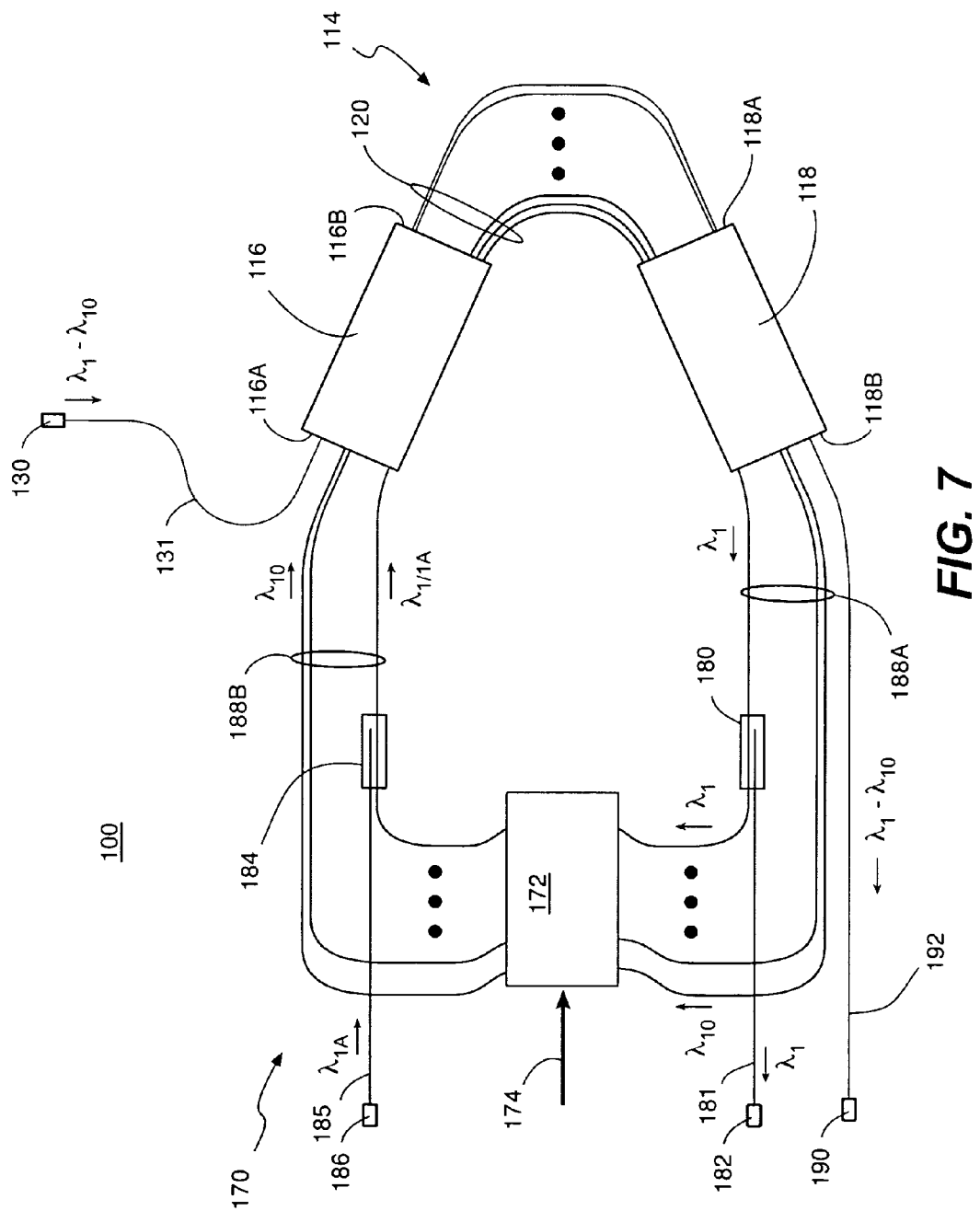
FIG. 7 depicts a photonic integrated circuit incorporating a feedback loop according to another embodiment of the present invention.

Now turning to FIG. 7, another embodiment incorporating reflection suppression elements will be discussed in greater detail. As shown, FIG. 7 depicts a photonic integrated circuit 100 generally comprising an input port 130, an AWG 114, an output port 190 and a feedback loop 170. Feedback loop 170 comprises one or more feedback devices or elements which provides or operates to provide one or more desired functions on one or more signal channel. Such exemplary feedback devices include, but are not limited to, one or more semiconductor optical amplifiers, variable optical attenuators, reconfigurable couplers, signal splitting couplers, add signal couplers or switches, and drop signal couplers or switches. The desired functions provided by these exemplary feedback devices on one or more signal channels includes, but are not limited to, amplification of the optical signal, attenuation of the optical signal, coupling the optical signal from a first waveguide to a second waveguide, switching the optical signal such that the optical signal received on an input waveguide is directed to one of a plurality of waveguides.

While AWG 114 is able to receive a multiplexed signal, such as a WDM signal, and demultiplex the signal into individual signal channels $\lambda_1$-$\lambda_n$, AWG 114 provides additional functionality. More specifically, AWG 114 is designed to provide dual functions: demultiplex a first input WDM signal into corresponding signal channels $\lambda_1$-$\lambda_n$ which are then provided as a first output of the AWG 114; and multiplex a plurality of input channels $\lambda_1$-$\lambda_n$ provide at a second input to the AWG 114 into a multiplexed signal which is provided as a second output of the AWG 114. To achieve this dual functionality the AWG 114 has been designed to accept two inputs and provide two outputs, as is discussed in greater detail below.

As shown, an input multiplexed signal, for example a WDM signal comprising ten signal channels denoted as $\lambda_1$-$\lambda_{10}$, is received by the photonic integrated circuit 100 via the input port 130 traveling to the AWG 114 via a waveguide 131. AWG 114, as with AWG 14, comprises a first slab or free space region 116, a second slab or free space region 118 and a plurality of grating arms 120 of predetermined increasing length. The WDM signal is received by the AWG 114 as a first of two inputs at the first free space region 116, and is demultiplexed into individual signal channels $\lambda_1$-$\lambda_{10}$, which are provided as a first of two outputs from the second free space region 118. The signal channels $\lambda_{10}$-$\lambda_{10}$ are coupled as an input to the feedback loop 170 by way of respective waveguides 188A.

In general, once the signal channels $\lambda_1$-$\lambda_{10}$ enter the feedback loop 170 along waveguides 182A, the signal channels are presented to one or more feedback devices, as discussed above, for performing a desired function on one or more of the signal channels. After the desired function or functions have been performed, signal channels $\lambda_1$-$\lambda_{10}$ are provides as a second of two inputs to first free space region 116 by way of respective waveguides 188B. Due to the design of AWG 114, the signal channels $\lambda_1$-$\lambda_{10}$ received at the second input of the free space region 116 are multiplexed into a single WDM signal and provided as a second of two outputs from free space region 118. The WDM signal output from the second free space region 118 is coupled to an output port 190 from photonic integrated circuit 100 by waveguide 192. It is important to note, while only one waveguide 192 and corresponding output port 190 is depicted, circuit 100 may include a plurality of waveguides $192_n$ which interface to the output of free space region 118, each waveguide $192_n$ configured to couple the WDM signal to a respective one of a plurality of output ports $190_n$, one of the plurality of output ports $190_n$, generally having the best signal characteristics, selected for transmission as an output from circuit 100.

For simplicity of discussion, only one exemplary desired function performed on one signal channel ($\lambda_1$) will be discussed with reference to FIG. 7, however one of ordinary skill in the art should appreciate that this discussion can be easily applied to additional functions performed on one or more signal channels traveling in the feedback loop 170, such as those functions described or contemplated herein. The exemplary feedback loop 170 depicted in FIG. 7 acts as an add/drop system for selectively adding and/or dropping optical signals as part of the plurality of signal channels.

As shown in FIG. 7, signal channel $\lambda_1$, one of a plurality of signal channels, is provided as an output from the output free space region 118 of AWG 114 and coupled to a first feedback device or optical coupler 180. As shown in FIG. 7, optical coupler 180 couples the optical signal channel $\lambda_1$ to a waveguide 181 which, in turn, provides the optical signal to an output port 182 for output from the optical circuit 100. In this way optical coupler 180 operates to couple the optical signal channel $\lambda_1$ to waveguide 181 and output port 182. Optical coupler 180 may be any suitable optical coupler which can couple the optical signal to the waveguide 181, such as a 3 dB coupler know in the art. Waveguide 188A corresponding to signal channel $\lambda_1$ continues past coupler 180 to reach a second exemplary feedback device, semiconductor optical amplifier 172. In this exemplary setup semiconductor optical amplifier 172 acts as a gateway either blocking or passing the optical signal of signal channel $\lambda_1$. Waveguide 188A corresponding to signal channel $\lambda_1$ couples the optical signal to the semiconductor optical amplifier 172 and a corresponding waveguide 188B which, in turn, couples the signal channel $\lambda_1$ to a third feedback device, optical coupler 184. As with optical coupler 180, optical coupler 184 couples an optical signal between waveguide 188B and a corresponding waveguide 185. Waveguide 185 couples an optical signal received at an input port 186 with corresponding waveguide 188B. In this way optical coupler 184 operates to couple the optical signal channel $\lambda_{1A}$ traveling along waveguide 185 to waveguide 188B. As with coupler 180, optical coupler 184 may be any suitable optical coupler which can couple the optical signal to the waveguide 188B, such as a 3 dB coupler know in the art.

As depicted in the exemplary configuration of FIG. 7, feedback loop 170 provides add/drop functionality to circuit 100. If operating to add a new signal channel, $\lambda_{1A}$, in place of signal channel $\lambda_1$ while dropping $\lambda_1$, the semiconductor optical amplifier 172 corresponding to signal channel $\lambda_1$ would be reverse-biased, absorbing the optical energy and preventing passage of signal channel $\lambda_1$ from proceeding. The primary signal channel $\lambda_1$, if desired, could be simultaneously dropped by way of output port coupler 180 and output port 182. The secondary signal channel $\lambda_{1A}$ would then be provided at input port 186 and coupled onto corresponding waveguide 188B through coupler 184 and provided as one part of the second of two inputs provided to input 116A of input free space region 116. Ultimately, signal channel $\lambda_{1A}$ would then be multiplexed by AWG 114 and provided to output port 190 as part of the multiplexed output signal. Conversely, if signal channel $\lambda_1$ is to simply pass through and remain part of the outgoing multiplexed signal, semiconductor optical amplifier 172 corresponding to signal channel $\lambda_1$ would amplify the optical energy of signal channel $\lambda_1$, compensating for the losses in couplers 180 and 184.

For the reasons set forth above, the gain provided by the semiconductor optical amplifier may become compromised due to the presence of undesirable noise, ASE for example. Therefore, one or more reflection suppression structures in accordance with this invention may be utilized at one or more locations within the circuit 100, including the input end 116A or output end 116B of input free space region 116, and the input end 118A or output end 118B of output free space region 118.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A photonic integrated circuit, comprising:
   a substrate;
   an arrayed wavelength grating provided on the substrate and including first and second free space regions, each having first and second ends, and a plurality of first waveguides extending from the first end of the first free space region to the first end of the second free space region;
   a second waveguide provided on the substrate, the second waveguide coupled to the second end of the second free space region, the second waveguide being configured such that first light travels in the second waveguide in a propagation direction extending away from the second end of the second free space region; and
   a third waveguide provided on the substrate and having a terminating edge, the third waveguide extending from the second end of the second free space region in the propagation direction to the terminating edge, the third waveguide having a width that narrows in the propagating direction, such that light propagating in the third waveguide is dissipated into the substrate.

2. The photonic integrated circuit of claim 1, wherein the second free space region is an output free space region of the arrayed wavelength grating.

3. The photonic integrated circuit of claim 1, wherein the second free space region is an input free space region of the arrayed wavelength grating.

4. The photonic integrated circuit of claim 1, wherein a longitudinal axis of the third waveguide is symmetrical with respect to a line perpendicular to the second end of the second free space region and bisecting the third waveguide at a point where the third waveguide couples to the second end of the second free space region.

5. The photonic integrated circuit of claim 1, wherein a longitudinal axis of the third waveguide is non-symmetrical with respect to a line perpendicular to the second end of the second free space region and bisecting the third waveguide at a point where the third waveguide couples to the second end of the second free space region.

6. The photonic integrated circuit of claim 5, wherein the third waveguide includes a curved portion.

7. The photonic integrated circuit of claim 1, wherein third light propagating through the second free space region is directed toward a plurality of focal points adjacent the second end of the second free space region, the third waveguide having a width at a point where the waveguide couples to the second end of the second free space region sufficient to receive third light associated with at least one of the plurality of focal points.

8. The photonic integrated circuit of claim 1, wherein a location where the third waveguide is coupled to the second end of the second free space region corresponds to a 1st order Brillouin Zone of the second end of the second free space region.

9. The photonic integrated circuit of claim 1, wherein a location where the third waveguide is coupled to the second end of the second free space region corresponds to a Brillouin Zone having a higher order than a 1st order Brillouin zone of the second end of the second free space region.

10. The photonic integrated circuit of claim 1, wherein a length of the second waveguide is greater than a length of the third waveguide.

11. The photonic integrated circuit of claim 1, further comprising a semiconductor optical amplifier provided on the substrate, the semiconductor optical amplifier having an input configured to receive a portion of the first light.

12. A photonic integrated circuit, comprising:
   a substrate;
   an arrayed wavelength grating provided on the substrate and including first and second free space regions, each having first and second ends, and a plurality of first waveguides tending from the first end of the first free space region to the first end of the second free space region;
   a second waveguide provided on the substrate, the second waveguide coupled to the second end of the second free space region, the second waveguide being configured such that first light travels in the second waveguide in a propagation direction extending away from the second end of the second free space region; and
   a third waveguide provided on the substrate and having a terminating edge, the third waveguide extending from the second end of the second free space region in the propagation direction to the terminating edge, the third waveguide having a width that narrows in the propagating direction, such that light propagating in the third waveguide is dissipated into the substrate; and
   a feedback loop coupled between the second end of the second free space region and the second end of the first free space region, the feedback loop comprising a semiconductor optical amplifier having an input and an output, and fourth and fifth waveguides, the fourth waveguide configured to receive a first optical signal from the second end of the second free space region and provide the first optical signal to the input of the semiconductor optical amplifier, the semiconductor optical amplifier configured to apply a gain to the first optical signal and provide an amplified first optical signal at the output of the semiconductor optical amplifier, the fifth waveguide configured to receive the amplified first optical signal from the output of the semiconductor optical amplifier and provide the amplified first optical signal to the second end of the first free space region.

13. The photonic integrated circuit of claim 12, further comprising a sixth waveguide and an optical coupler, the optical coupler coupling a second optical signal on the sixth waveguide to the fifth waveguide, wherein the semiconductor optical amplifier operates to provide a gain of zero to the first optical signal to prevent the first optical signal from passing therethrough, the fifth waveguide providing the second optical signal as an input to the second end of the first free space region.

14. The photonic integrated circuit of claim 13, wherein the optical coupler is a first optical coupler, the photonic integrated circuit further comprising a sixth waveguide and a second optical coupler, the second optical coupler coupling the first optical signal on the third waveguide to the sixth waveguide.

15. The photonic integrated circuit of claim 12, wherein the feedback loop is formed on the substrate.

16. The photonic integrated circuit of claim 12, further comprising one or more feedback devices selected from the group consisting of variable optical attenuators, reconfigurable couplers, signal splitting couplers, add signal couplers or switches, and drop signal couplers or switches.

* * * * *